United States Patent [19]

Maringer et al.

[11] 4,343,733

[45] Aug. 10, 1982

[54] STABILIZED POLYMER COMPOSITIONS

[75] Inventors: Melvin F. Maringer, Cincinnati, Ohio; Fred K. Morgan, Cold Springs, Ky.

[73] Assignee: National Distillers & Chemical Corp., New York, N.Y.

[21] Appl. No.: 211,487

[22] Filed: Dec. 1, 1980

Related U.S. Application Data

[63] Continuation-in-part of Ser. No. 38,957, May 14, 1979, abandoned.

[51] Int. Cl.$^3$ .......................... C08K 3/20; C08K 3/26; C08K 5/18; C08K 5/34
[52] U.S. Cl. ..................................... 524/87; 106/169; 106/176; 106/186; 252/397; 252/401; 252/405; 524/254; 524/425; 524/433; 524/436
[58] Field of Search ...... 260/42.42, 45.7 R, 45.8 NW, 260/42.29; 252/400 R, 401

[56] References Cited

U.S. PATENT DOCUMENTS

| | | | |
|---|---|---|---|
| 3,367,903 | 2/1968 | Deis et al. | 260/42.42 |
| 3,554,959 | 1/1971 | Hammersley et al. | 260/45.8 NW |
| 3,627,728 | 12/1971 | Fernandes et al. | 260/42.42 |
| 4,022,945 | 5/1977 | Mackenzie, Jr. et al. | 428/389 |
| 4,123,586 | 10/1978 | Betts et al. | 428/391 |
| 4,124,655 | 11/1978 | Koehnlein et al. | 260/45.8 NW |
| 4,173,561 | 11/1979 | Tabana et al. | 260/45.7 R |
| 4,243,579 | 1/1981 | Keogh | 260/45.7 R |

*Primary Examiner*—John Kight, III
*Assistant Examiner*—R. A. White
*Attorney, Agent, or Firm*—Kenneth D. Tremain

[57] ABSTRACT

A synergistic stabilizer combination is provided for use in improving the resistance of polymers, such as olefin polymers and copolymers, to deterioration in physical properties upon exposure to heat. The stabilizer combination contains a quinoline compound, a diamine compound and a magnesium compound in correlated amounts. In addition, olefin polymer compositions such as an ethylene-vinyl acetate copolymer composition containing the synergistic stabilizer combination and a method for preparing the compositions are provided.

11 Claims, No Drawings

STABILIZED POLYMER COMPOSITIONS

CROSS-REFERENCE TO RELATED APPLICATION

This application is a continuation-in-part of commonly assigned copending U.S. application Ser. No. 38,957, filed May 14, 1979, now abandoned.

BACKGROUND OF THE INVENTION

The present invention relates to a synergistic stabilizer combination useful for improving the resistance of polymers, such as olefin polymers and copolymers, to deterioration in physical properties due to heat, comprising a quinoline compound, a diamine compound and a magnesium compound, polymer compositions having an enhanced resistance to heat deterioration due to incorporation therein of such combinations, and to a process of preparing such polymer compositions.

Polymers, such as olefin polymers and copolymers, and particularly ethylene-vinyl acetate copolymers, have numerous valuable properties which permit them to be used in the manufacture of film, wire or cable coating, extruded profile shapes such as pipe, tubing, moldings etc. and extrusion coated paper, cloth, plastic films, etc. or various molded objects such as injection molded cups, containers, caps, toys, appliance parts, etc. and blow molded bottles, tanks, various shapes and the like. It has been observed, however, that such polymers under conditions of elevated temperature, particularly in the presence of atmospheric oxygen, undergo degradation, resulting in the deterioration of physical properties. Stabilization of such polymers is of utmost importance to industry in order to protect the polymer during fabrication and in use.

Considerable study has been devoted to the effects and prevention of thermal or heat degradation in polymers. Thermal degradation, as concerned with here, is usually oxidation occurring in ordinary atmospheres which varies or accelerates with increasing temperature and antioxidant materials have consequently been developed which provide a marked retardation of such thermal degradation. A thorough treatment of antioxidant materials and mechanisms can be found in the "Encyclopedia of Polymer Science and Technology", Volume 2, Interscience Publishers, pages 171–197. Amine antioxidants and combinations thereof are disclosed in the reference and on page 186, under section J, is disclosed a mixture of polymerized 1,2-dihydro-2,2,4-trimethyl quinoline and N,N'-diphenyl-p-phenylene diamine. U.S. Pat. Nos. 2,941,979; 2,955,100; 3,024,217; 3,367,903 and 3,657,203 are exemplary patents showing the use of antioxidants in polymer and rubber compositions. Unfortunately, these compounds and combinations thereof, have not provided the desired degree of protection of the polymer for many applications requiring enhanced protection from degradation at elevated temperatures.

One important application for a heat stabilized polymer is in electrical wire and cable coating applications. For these applications, it is important that the polymer wire sheathing have enhanced thermal stability especially when used as wiring for appliances. Appliances, such as electric ranges, clothes dryers, furnaces, irons, broilers, heaters and the like have a high thermal output and it is important that the insulated wire have thermal stability over a wide range of temperatures. For example, maintenance of physical properties of the polymer at an accelerated aged condition of seven days at 180° C. is necessary for many such applications. A physical property of the polymer which is particularly important to be stabilized is the % Elongation. A marked decrease in this property over time at elevated temperatures significantly limits the polymers utility as wire sheathing since the polymer becomes brittle and cracks may develop during use.

It is an object of this invention to provide a new synergistic stabilizer combination for polymer compositions. Another object is to provide novel polymer compositions containing a synergistic combination of compounds that enhances the thermal stability of the polymer composition. Other objects of the invention will be apparent from the description and claims that follow.

SUMMARY OF THE INVENTION

It has now been discovered that the combination of (a) a N,N'-disubstituted-p-arylene diamine, (2) a 1,2-dihydro-2,2,4-trialkyl quinoline and polymers thereof and (3) a magnesium compound possesses a synergistic ability to protect polymers against heat degragation and that the protection is retained even after severe aging, such as heating at high temperatures for extended periods of time.

A preferred embodiment of the invention utilizes a polyolefin as a polymer component. Especially preferred are copolymers of ethylene and vinyl acetate, with copolymers containing, by weight %, about 5% to 70% with 7% to 30% vinyl acetate being highly preferred. The preferred diamine compound is N,N'-di-β-naphthyl-p-phenylene diamine, the preferred quinoline compound is polymerized 1,2-dihydro-2,2,4-trimethyl quinoline and the preferred magnesium compound is magnesium oxide. For convenience, the following description will refer to the diamine component as "diamine" and to the quinoline component as "quinoline".

DESCRIPTION OF THE PREFERRED EMBODIMENTS

The N, N'-disubstituted-p-arylene diamines useful in the invention include polymer soluble diamines such as those disclosed in the aforementioned "Encyclopedia of Polymer Science and Technology" and U.S. Pat. Nos. 3,024,217 and 3,657,203, which are incorporated herein by reference. The substituents include alkyl, isoalkyl, cycloalkyl and aryl radicals. Exemplary diamines include N,N'-diphenyl-p-phenylene diamine, N-cyclohexyl-N'-phenyl-p-phenylene diamine and N-phenyl-N'-tolyl-p-toluylene diamine. Especially preferred is N,N'-di-β-naphthyl-p-phenylene diamine which is available as Age Rite White from R. T. Vanderbilt Co.

The 1,2-dihydro-2,2,4-trialkyl quinolines and polymers thereof useful in the invention include the alkyl, alkoxy, carboxy, or halogen substituted compounds wherein the alkoxy preferably contains about 1–5 carbon atoms and the alkyl preferably contains about 1–3 carbon atoms. Particularly preferred is polymerized 1,2-dihydro-2,2,4-trimethyl quinoline sold as Age Rite Resin D by R. T. Vanderbilt Co. Exemplary quinolines include 6-ethoxy-2,2,4-trimethyl-1,2-dihydroquinoline and 6-phenyl-2,2,4-trimethyl-1,2-dihydroquinoline. Other quinolines may be found in the aforementioned Encyclopedia and U.S. patent references.

The preferred magnesium compound is magnesium oxide. Other suitable magnesium compounds such as magnesium hydroxide, magnesium carbonate, and the like may also be employed.

In general, the synergistic mixing comprises, by weight, about 5 to 25% diamine, about 15 to 60% quinoline, and about 25 to 75% magnesium compound. A preferred mixture contains about 8 to 15% diamine, about 25 to 40% quinoline, and about 40 to 60% magnesium compound.

The synergistic mixture of the invention can be added to the polymer composition in a stabilizing amount. In general, an amount of about 3 to 18 parts per 100 parts of polymer (phr) may be employed. Preferably, the amount is about 7 to 12 parts phr.

The polymers which may be stabilized with the synergistic mixture of the invention may vary widely and a number of these may be found in the publication "Flame Retarding of Polymeric Materials", Volumes 1 and 2, edited by W. C. Kuryla and A. J. Papa, Marcel Dekker, Inc., 1973, which is hereby incorporated by reference, and includes polyolefins, vinyls, olefin-vinyl copolymers, polyamides, cellulosics and polyesters.

Preferred polymers are normally solid polymers of aliphatic olefins having about 2 to 8 carbon atoms per molecule such as polymers of ethylene, propylene, 1-butene, isobutylene, 2-butene, 1-pentene, and copolymers thereof. A particularly preferred polymer is a copolymer of ethylene with a vinyl ester of a 2-6 carbon atoms aliphatic carboxylic acid such as vinyl formate. Highly preferred is a copolymer of ethylene and vinyl acetate wherein, by weight %, the vinyl acetate is about 5% to 70%, preferably 7% and 30%.

An important aspect of the invention is to provide polymers having enhanced protection against heat degradation and an important additive which may be added to the composition is a fire retardant additive. These additives are well known in the art and generally are chlorinated or brominated organic materials that contain at least 30% of said halogen. A wide variety of fire retardant additives may be found in the aforementioned publication "Flame Retardancy of Polymeric Materials". Two preferred fire retardant additives are decabromodiphenyloxide sold as FR-300-BA by Dow Chemical Co. and a material identified as SAYTEX BT-93 and sold by Saytex, Inc. An effective amount of fire retardant additive may be added to the polymer composition and, in general, an amount of about 3 to 100 phr, preferably 20 to 75 phr may be employed.

In conjunction with the fire retardant additive, it is desirable to incorporate an antimony compound into the formulation. Antimony trioxide is the preferred antimony compound, although many other antimony compounds may be utilized. Suitable inorganic antimony compounds include antimony sulfide, sodium antimonite and the like. Many organic antimony compounds are also suitable such as antimony salts of organic acids and their pentavalent derivatives disclosed in U.S. Pat. No. 2,996,528. The antimony additive will generally be employed in amounts ranging from about 3 to 80, preferably 10 to 50 phr.

For many applications, it is highly desirable to crosslink the polymer to increase the heat deformation temperature and thus increase the maximum operating temperature of the finished cable and permit a higher electrical load to be safely carried by the cable. This crosslinking makes the insulation material more resistant to moisture, chemical agents, abrasion, etc. Crosslinking, as is well-known in the art, can be accomplished by any of the known procedures such as chemical means, including peroxide crosslinking, by radiation, or by thermal crosslinking. The basic procedures for cross-linking polymers are extremely well-known to the art and need not be described here in detail.

It has been found useful to employ convention cross-linking agents such as an organic peroxide. Typical organic peroxide free radical generators include dicumyl peroxide; 2,5-bis tertbutylperoxy)-2,5 dimethylhexane; di-t-butyl peroxide, and the like, as discussed in U.S. Pat. No. 3,287,312. A particularly preferred peroxide is Vulcup 40 KE manufactured by Hercules, Inc. The amount of peroxide, when employed, ranges from about 1% to 5% by weight based on the total weight of the polymer composition or about 2 to 9 phr.

Monomeric coagents can also be employed with the organic peroxide to obtain crosslinking. These can be used at 0.5 to 5 phr and are preferred at 1 to 3 phr concentration. Preferred coagents are triallyl isocyanurate (TAIC) and triallyl cyanurate (TAC). Minor amounts of other additives known in the art may also be employed. Other ingredients that may be included are plasticizers, dyes, pigments, other heat stabilizers, light stabilizers, anti-static agents, anti-block agents, fillers, and the like. A preferred additive is an acid acceptor such as Lectro 78 manufactured by NL Industries in an amount of about 0.5 to 5 phr. A preferred embodiment of the invention also includes a copper inhibitor such as OABH (Oxalyl bis(benzylidenehydrazide)) manufactured by Eastman Chemical Products, Inc. in an amount of about 0.10 to 0.50 phr, which is especially useful for polymer compositions coated onto cable or wire. Fillers such as talc in an amount up to about 50 phyr may be employed, but preferably are less than about 20 phr, most preferably less than 5 phr, e.g., 0 phr. Coupling agents may also be employed. A preferred silane is Silane A-172 (Vinyl tris [2 methoxy ethoxy] silane) manufactured by Union Carbide Corp. Amounts of about 0.5 to 5 phr, preferably 1 to 3 phr. may be used.

The polymer compositions of the invention may be compounded or prepared by mixing the polymer in any suitable manner that will effect the thorough distribution and dispersion of the polymer, synergistic heat stabilizer mixture of the invention and other additives. This can be accomplished in a machine suitable for mixing solids, as by milling the polymer with the additives on heated rolls such as used in the compounding of rubber or on other suitable milling or mixing equipment, such as for example, a Banbury mixer. Another method is to dust the additives onto resin pellets and to extrude the mixture.

The synergistic heat stabilizer mixture of the invention lends to polymer compositions improved stability during processing and subsequent use, and more specifically, improved stability against deterioration by heat. Thus, polymers stabilized in accordance with the invention have an extended life expectancy and can be used more effectively than unstabilized polymers for a wide diversity of uses. Depending on the polymer employed, the polymers can be cast, extruded, rolled or molded into sheets, rods, tubes, piping, filaments and other shaped articles, including films. The present compositions can also be used for coating paper, cord, wire, metal foil, glass fiber, fabrics, synthetic and natural textiles and other such materials.

Following below are examples illustrating the invention although it is in no way intended to limit the invention thereto. Unless otherwise indicated, all parts and percentages in the specification and claims are based on weight.

EXAMPLE 1

The following compositions as shown in Table 1 were prepared as described hereinbelow in a Farrel Banbury mixer, Model No. BR. Parts are by weight.

All ingredients except the Vulcup 40 KE were charged to the Banbury. The ram was lowered and mixing was carried out for 7-8 minutes at the top rotor speed of 230 rpm. At this point the mix was at 245°-250° F. The rotor speed was reduced and the compound was mixed for two minutes with cooling water being circulated through the rotors and mixing chamber. With continued cooling on the rotors and chamber, the ram was raised and the rotor speed was reduced. The compound temperature was reduced to 200°-210° F. in about 2 minutes of mixing. The Vulcup 40 KE peroxide was added, the ram was lowered, and the compound was mixed for two minutes at 200°-220° F. with variation of mixing speed between 77 to 116 rpm to maintain the temperature below 220° F. The hot compound was dumped from the Banbury and sheeted out on a 6"×12" 2 roll mill at 220° F. The hot mill sheet was cut into squares about 4"×4" and cooled. Test plaques were prepared by compression molding the required amount of material for 5 minutes at 390° F.

Tensile strength (ASTM D-638) and % Elongation (ASTM D-638) tests were performed on cured plaques 6"×6"×0.075". The aged samples were stored for the noted time and temperature in Table 2 in a 180° C. oven.

TABLE 1

|  | Compositions | | | |
|---|---|---|---|---|
|  | 1 | 2 | A | B |
| Vinyl Acetate (VA)-Ethylene Copolymer (18 weight % VA) | 100 | 100 | 100 | 100 |
| Brominated fire retardant[a] | 28 | 28 | 28 | 28 |
| $Sb_2O_3$ | 35 | 35 | 35 | 35 |
| Talc | 30 | — | 30 | 30 |
| Age Rite Resin D | 3 | 3 | 3 | 3 |
| Age Rite White | 1 | 1 | 1 | 1 |
| Magnesium oxide[b] | 5 | 5 | — | — |
| Zinc oxide | — | — | 5 | — |
| Lectro 78 | 1 | 1 | 1 | 1 |
| Vulkup 40 KE | 4.5 | 4.5 | 4.5 | 4.5 |

[a]Saytex BT-93
[b]Maglite A

TABLE 2

|  | Compositions | | | |
|---|---|---|---|---|
|  | 1 | 2 | A | B |
| Tensile Strength | | | | |
| Unaged | 2490 | 2890 | 2500 | 2470 |
| 7 days at 180° C. | 1830 (73.5) | 2130 (73.7) | 1790 (71.6) | 1780 (72.1) |
| % Elongation | | | | |
| Unaged | 530 | 550 | 540 | 520 |
| 7 days at 180° C. | 340 (64.2) | 420 (76.4) | 270 (50.0) | 290 (55.8) |

( ) = % retention of original

The results in Table 2 clearly show the improved thermal stability of Compositions 1 and 2 (of the invention) as compared to Compositions A and B (not of the invention). Composition 2, not containing the talc filler, is especially preferred because of its high retained % Elongation. A comparison of Composition 1 (magnesium oxide) and A (zinc oxide) shows the importance for utilizing magnesium oxide.

EXAMPLE 2

EXAMPLE 1 was repeated except that decabromodiphenyloxide (FR 300-BA purchased from Dow Chemical Co.) was substituted for the Saytex BT-93. The compositions containing magnesium oxide (with and without talc filler) exhibited improved retention of % Elongation properties. Compositions containing either magnesium oxide or zinc oxide at levels of 2 phr were unacceptable.

EXAMPLE 3

The following comparative samples were prepared in a manner similar to the procedure for EXAMPLE 1. All parts are by weight and each sample contained 100 parts Vinyl Acetate (VA)-Ethylene Copolymer (18 weight %VA), 28 parts Dechlorane Plus 25 (a chlorinated flame retardant sold by Hooker Chemical Co.), 35 parts $Sb_2O_3$, 1 part Lectro 78, 5 parts Maglite A and 4 parts Vulkup 40 KE. The other ingredients are shown in TABLE 3.

TABLE 3

|  | Compositions | |
|---|---|---|
|  | 3 | C |
| Age Rite Resin D | 3 | — |
| Age Rite White | 1 | — |
| Weston 618 | — | 1 |
| 4 Di-PIP | — | 2 |
| Tensile Strength | | |
| Unaged | 3170 | 3560 |
| 7 days at 180° C. | 1560 (49.2) | 70 (27.5) |
| % Elongation | | |
| Unaged | 540 | 560 |
| 7 days at 180° C. | 330 (61.1) | 10 (1.8) |

Weston 618 is an antioxidant sold by Borg Warner Chemicals and is distearyl pentaerythritol diphosphite.
4 Di-PIP is 1,3,-di-4-piperidylpropane and is sold by Reilly Tar and Chemical Co.

EXAMPLE 4

EXAMPLE 3 was repeated except that the samples also contained 2 parts Surfaid 79, 0.25 parts Cobratec 99 and 1 part Dow Silicone X9-6318 (except for Sample E). The other ingredients are shown in TABLE 4.

TABLE 4

|  | Compositions | | |
|---|---|---|---|
|  | 4 | D | E |
| Age Rite Resin D | 3 | — | — |
| Age Rite White | 1 | — | — |
| Weston 618 | — | 2 | — |
| DSTDP | — | 3 | 3 |
| Cyanox 1790 | — | 0.5 | 0.5 |
| Weston XP 1532 | — | — | 2 |
| Tensile Strength | | | |
| Unaged | 1900 | 1930 | 2170 |
| 7 days at 180° C. | 2260 (>100) | 710 (36.9) | 760 (35.0) |
| % Elongation | | | |
| Unaged | 520 | 520 | 550 |
| 7 days at 180° C. | 440 (84.6) | 70 (13.5) | 40 (7.3) |

Surfaid 79 is a modified ricinoleate derivative sold by NL Industries.
Cobratec 99 is benzotriazole and is sold by Sherwin-Williams Chemical Co.
Dow Silicone X9-6318 is a shear grafted mixture of polyolefin resin and silicone rubber gum.
DSTDP is sold by American Cyanamide Co. and is distearyl thiodipropionate.
Cyanox 1790 is sold by American Cyanamide Co. and is 1,3,5-tris(4-tert-butyl-3-hydroxy-2,6-dimethyl benzyl)-1,3,5-triazine-2,4,6-(1H, 3H, 5H)-trione.
Weston XP 1532 is sold by Borg Warner Chemicals Co. and is Bis(2,4-di-t-butyl phenyl)pentaerythritol diphosphite.

We claim:

1. A synergistic mixture for protecting polymers against heat degradation which comprises, by weight,
   (a) about 5 to 25% of a N,N'-disubstituted-p-arylene diamine;
   (b) about 15 to 60% of a 1,2-dihydro-2,2,4-trialkyl quinoline and polymers thereof; and
   (c) about 25 to 75% of magnesium oxide, hydroxide or carbonate.

2. A synergistic mixture as in claim 1 wherein the magnesium compound is magnesium oxide.

3. A method for protecting polymers against heat degradation which comprises compounding the polymer with the synergistic mixture of claims 1 or 2.

4. A polymer composition with improved protection against heat degradation containing a stabilizing amount of the synergistic mixture of claim 1 and wherein the polymer is selected from the group consisting of polyolefins, vinyls, olefinvinyl copolymers, polyamides, cellulosics and polyesters.

5. A composition in accordance with claim 4 wherein the magnesium compound is magnesium oxide.

6. A composition in accordance with claim 5 containing an organic peroxide cross-linking agent.

7. A composition in accordance with claim 5 containing an effective amount of a fire retardant additive.

8. A composition in accordance with claims 4, 5, 6 or 7 wherein the polymer is a copolymer of ethylene and vinyl acetate containing, in weight %, about 5 to 70% vinyl acetate.

9. A composition in accordance with claim 8 wherein the quinoline compound is polymerized 1,2-dihydro-2,2,4-trimethyl quinoline and the diamine compound is N,N'-di-$\beta$-naphthyl-p-phenylene diamine.

10. A composition according to claim 9 containing as a fire retardant additive decabromodiphenyloxide.

11. A composition in accordance with claim 9 which contains less than about 5 phr of a filler material other than a magnesium compound.

* * * * *